(12) United States Patent
Tabuchi et al.

(10) Patent No.: US 6,609,980 B2
(45) Date of Patent: Aug. 26, 2003

(54) FLEXIBLE JOINT

(75) Inventors: Yasuo Tabuchi, Toyoake (JP); Masao Nakano, Okazaki (JP); Junichi Ohguchi, Toyoake (JP); Kiyomi Okuda, Kariya (JP); Manabu Saiki, Chiryu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/971,184

(22) Filed: Oct. 5, 2001

(65) Prior Publication Data
US 2002/0049089 A1 Apr. 25, 2002

(30) Foreign Application Priority Data

Oct. 25, 2000 (JP) ........................ 2000-325722
Mar. 15, 2001 (JP) ........................ 2001-074898

(51) Int. Cl.⁷ ............................................. F16D 9/08
(52) U.S. Cl. ........................................... 464/32; 464/74
(58) Field of Search ......................... 464/30, 32, 74, 464/76, 89, 92; 192/56.5; 417/319

(56) References Cited

U.S. PATENT DOCUMENTS 2,993,544 A  * 7/1961 Carlson ..................... 464/32
6,332,842 B1 * 12/2001 Tabuchi et al. ........... 464/32 X
6,358,152 B2 *  3/2002 Casutt ....................... 464/32
6,457,947 B1 * 10/2002 Seipel et al. ........... 192/56.5 X

FOREIGN PATENT DOCUMENTS

DE         24 20 515    *  4/1975   .................. 464/32
SE            70237     *  9/1930   .................. 464/30

* cited by examiner

Primary Examiner—Greg Binda
(74) Attorney, Agent, or Firm—Posz & Bethards, PLC

(57) ABSTRACT

In a flexible joint having a first rotating body connected to a shaft of an engine, a second rotating body coaxially connected to the first rotating body via a first rubber damper, and a third rotating body whose outer circumference is coaxially coupled with the second rotating body via a second rubber damper and whose center axis is coaxially connected to a shaft of a compressor, the second rotating body is rotatably held by a front housing of the compressor. Accordingly, eccentric load acting on the joint according to the rotation thereof is received by the housing of the compressor so that the shaft of the compressor receives lower bending moment. Further, as the first and second rubber dampers are used, a composite elastic coefficient thereof is smaller so that torque fluctuation applied to the joint is adequately absorbed.

4 Claims, 15 Drawing Sheets

FLEXIBLE JOINT

CROSS REFERENCE TO RELATED APPLICATION

This application is based upon and claims the benefit of priority of Japanese Patent Application No. 2000-325722 filed on Oct. 25, 2000 and No. 2001-74898 filed on Mar. 15, 2001, the contents of which are incorporated herein by reference.

BACKGROUND OF THE INVENTION

1. Field of the Invention

The present invention relates to a flexible joint for transmitting torque from a drive device such as an engine or a power motor to a driven device such as a pump or a compressor.

2. Description of Related Art

Conventionally, as shown in FIG. 20, a pulley P (first rotor) receives torque from a driving source such as an engine. A cylindrical inner wall of the pulley P is press fitted to an outer circumference of a radial contact roller bearing Q whose inner circumference is fixed to a housing (not shown) of a driven device such as a compressor so that the pulley P is rotatably held by the driven device. An inner wall of a ring shaped damper cup Dc (second rotor) is fixed by welding to the inner wall of the pulley P. A driven rotor H (third rotor) having a center hub is fixed to a shaft (not shown) of the driven device. A damper D, which is made of elastic material such as rubber or elastmer, is accommodated in the damper cup Dc so as to be sandwiched between the damper cup Dc and the driven rotor H for absorbing a torque fluctuation. Accordingly, the torque of the pulley P is transferred to the shaft of the driven device via the damper cup Dc, the damper D and the driven rotor H.

In a case that the driven rotor has a torque limiter that serves to interrupt a torque transmission when torque applied to the flexible joint exceeds a predetermined value, it is necessary to adequately absorb a pulsating torque fluctuation, which, in particular, occurs at high speed and high load operation, for the purpose of avoiding erroneous break down of the torque limiter.

To adequately absorb the torque fluctuation, it is better to have a larger damper since, as the size of the damper is larger, its elastic coefficient (spring constant) is lower. However, to accommodate the larger damper in the second rotating body (damper cup), it is necessary to enlarge an outer wall diameter of the second rotating body since the inner wall of the second rotating body is fixed to the inner wall of the pulley, which results in enlarging an outer diameter of the pulley.

SUMMARY OF THE INVENTION

It is an object of the present invention to provide a flexible joint with a torque limiter in which torque fluctuation is successfully absorbed without enlarging a body size thereof, compared to the conventional flexible joint.

Another object of the invention is to provide a flexible joint in which an eccentric load applied thereto (load acting perpendicular to a drive or driven shaft) is not transferred from the drive shaft to a driven shaft.

It is an aspect of the present invention to provide the flexible joint a part of which is rotatably held by a housing of a drive or driven device to absorb the eccentric load.

It is another aspect of the present invention to provide the flexible joint in which first and second rubber dampers are disposed at different positions and in series between a driving device and a driven device so that a composite elastic coefficient of the dampers is smaller.

A further aspect of the present invention is to provide the flexible joint in which a second rotating body has a larger inside space for accommodating a larger damper without enlarging an outer diameter of the second rotating body.

To accomplish the above-described object, the flexible joint is composed of a first rotating body connected to a shaft of one of drive and driven devices, a second rotating body that is coaxially connected with the first rotating body and has an outer circumferential wall and an inner wall that is rotatably held by a housing of the other one of the drive and driven devices, a third rotating body connected to a shaft of the other one of the drive and driven devices, and an elastically deformable first damper through which the second rotating body is coaxially coupled with the third rotating body at a position inside the outer circumferential wall and outside the inner wall. The third rotating body is provided with a torque limiter that, when torque applied to the third rotating body exceeds a predetermined value, serves to interrupt a torque transmission from the shaft of the drive device to the shaft of the driven device via the first and second rotating body.

It is preferable that the first rotating body is a pulley whose inner circumference is connected to an outer circumference of the outer circumferential wall.

Further, as an alternative, the first rotating body may be connected to the second rotating body on a side axially opposite to the inner wall rotatably held by the other one of the drive and driven devices.

As the second rotating body is rotatably held by the other one of the drive and driven devices without sandwiching a part of the first rotating body therebetween, inner radial space of the second rotating body between the outer circumferential wall and the inner wall, where the first damper is accommodated, is larger. Accordingly, a larger size of the first damper may be employed to effectively absorb the torque fluctuation.

Preferably, an elastically deformable second damper is disposed between an outer circumference of the first rotating body and an inner circumference of the second rotating body to transfer the torque between the first and second rotating bodies. When the torque transferred from the shaft of the drive device to the shaft of the driven device, an excessive torque fluctuation is absorbed by both of the first and second dampers. Accordingly, stress occurring in each of the first and second dampers is smaller so that, while each life time of the first and second dampers is longer, an entire body of the flexible joint is more compact.

Preferably, the second rotating body is provided on the outer circumferential wall with a plurality of inward protrusions extending radially inward at given angular intervals. The third rotating body is provided on an outer circumference thereof with a plurality of outward protrusions extending radially outward at given angular intervals. The respective inward and outward protrusions are alternately positioned circumferentially so as to be overlapped radially with each other. The first damper is composed of a plurality of damper piece units circumferentially arranged between the respective inward and outward protrusions.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

DETAILED DESCRIPTION OF THE PREFERRED EMBODIMENT

First Embodiment

Figure 1:
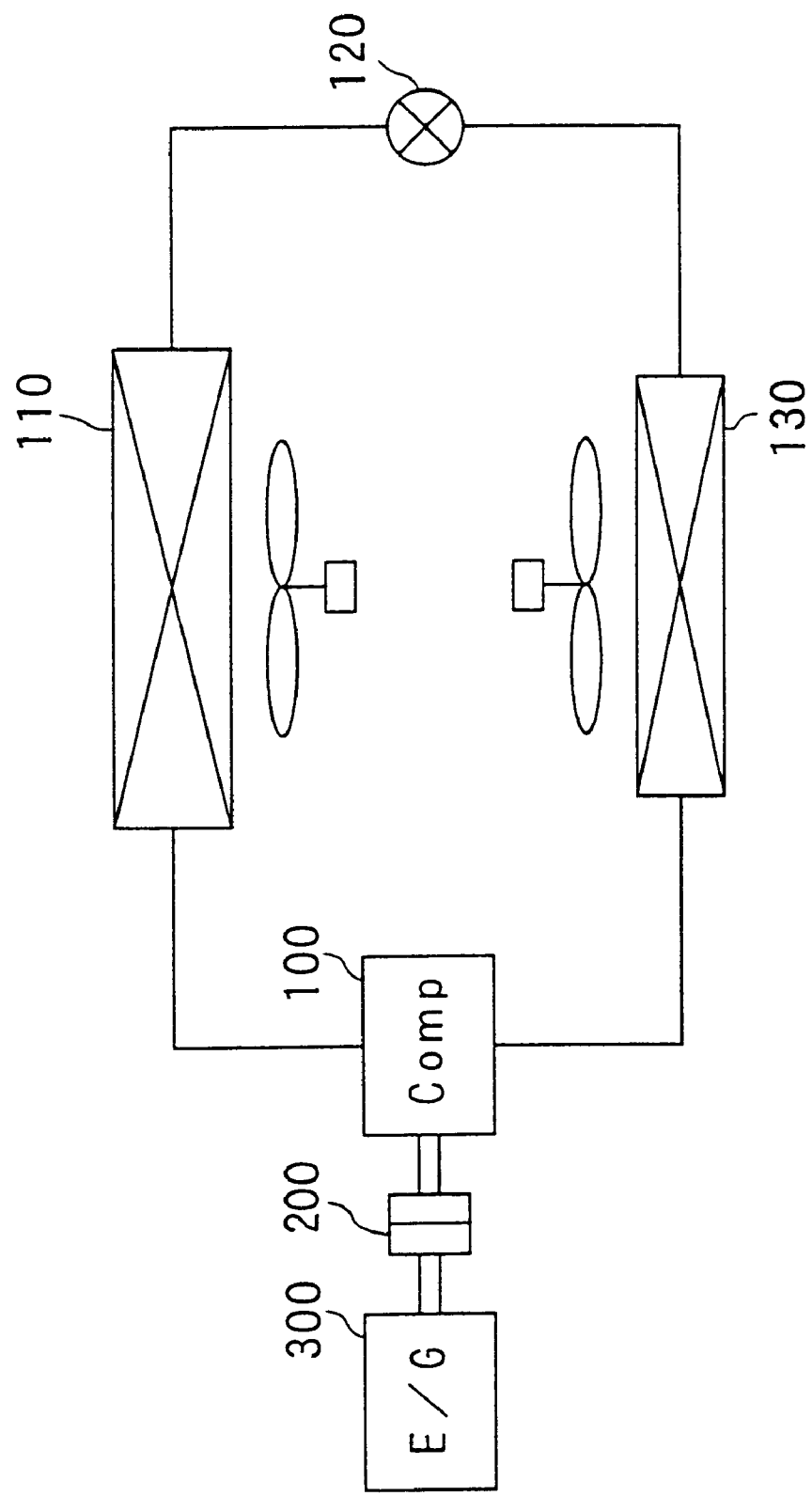
FIG. 1 is a schematic diagram of an air conditioner according to embodiments of the present invention.

FIG. 1 shows a conceptual diagram of a stationary air conditioner to which a flexible joint 200 (hereinafter called a joint 200) according to a first embodiment is applied.

A compressor 100 (driven device) sucks, compresses and discharges refrigerant upon receiving a drive force from an internal combustion engine 300 (drive device) via the joint 200. The refrigerant discharged from the compressor 100 is cooled (condensed) in a radiator 110 (condenser). High pressure of the refrigerant flowed out from the radiator 110 is reduced in a pressure reducer 120. An evaporator 130 evaporates the refrigerant whose pressure is reduced by the pressure reducer 120 so as to secure a given refrigeration capacity.

According to the first embodiment, the pressure reducer 120 is a preset throttle such as an orifice or a capillary tube whose opening degree is fixed in advance. Control of the refrigerant capacity (flow rate of circulation refrigerant) is performed by adjusting revolution of the internal combustion engine 300 (hereinafter called the engine 300).

Figure 2:
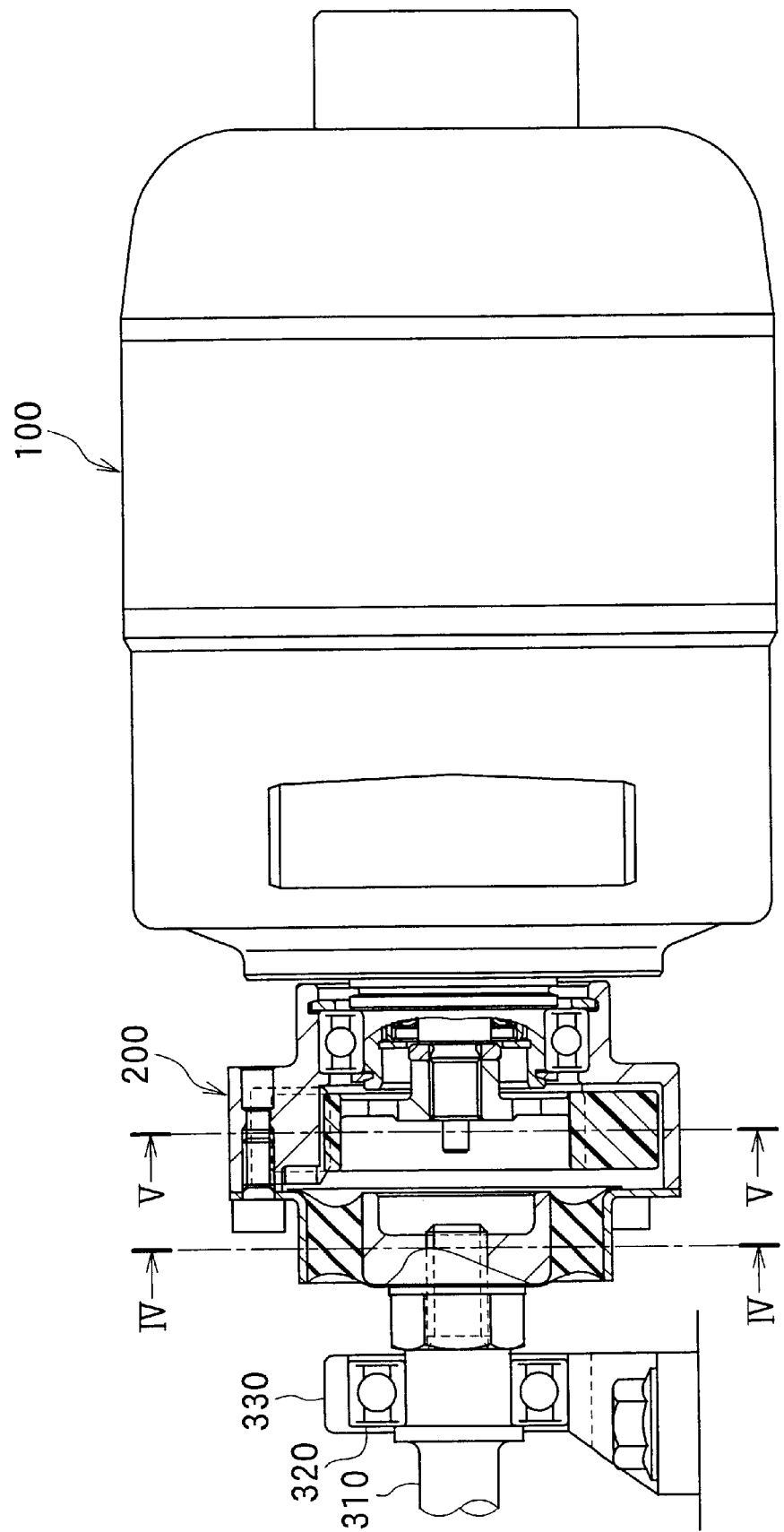
FIG. 2 is a cross sectional view of a joint applied to the air conditioner according to a first embodiment.
Figure 3:
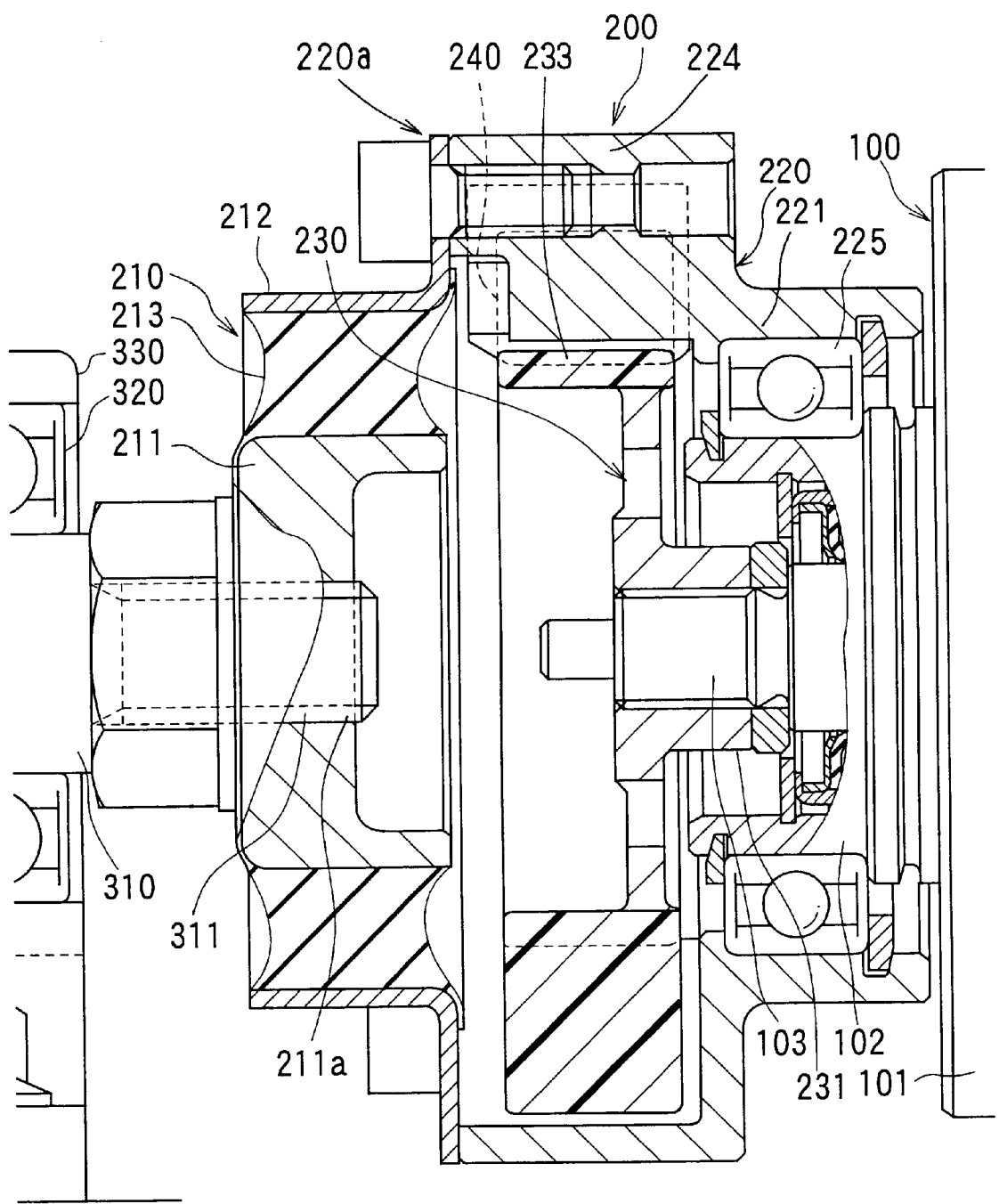
FIG. 3 is an enlarged cross sectional view of the joint of FIG. 2.

FIG. 2 is a cross sectional view of the joint 200 which is installed in the compressor 100. FIG. 3 shows an enlarged cross sectional view of the joint 200.

As shown in FIGS. 2 and 3, the engine 300 drives to rotate a drive shaft 310. A radial contact roller bearing 320 supports rotatably the drive shaft 310. The radial contact roller bearing 320 is supported by a bracket 330. The bracket 330 is fixed by bolts to a base (not shown) to which the compressor 100 is fixed. The drive shaft 310 drives to rotate a first rotating body 210.

Figure 4:
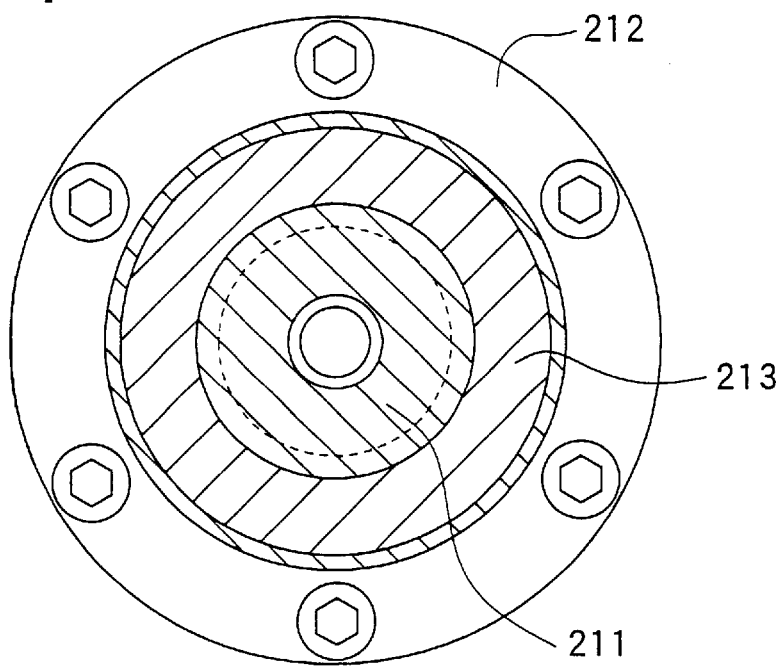
FIG. 4 is a cross sectional view taken along a line IV—IV of FIG. 2.

As shown in FIG. 4, a metal drive hub 211 (first rotating body) is connected mechanically (by screw) to the drive shaft 310. A male thread portion 311 formed on an axial end thereof is screwed into a female thread portion 211a formed in the drive hub 211. A metal drive ring 212 (a part of a second rotating body) is coaxially disposed to surround the drive hub 211 with a radial interval. A second damper 213 made of elastically deformable material such as EPDM (a three elements copolymer rubber made of ethylene, propylene and xylem) is disposed between the drive hub 211 and the drive ring 212 for transferring torque transferred from the drive hub 211 to the drive ring 212. The drive hub 211, the drive ring 212 and the second damper 213 are adhered to each other and integrated into one body by vulcanizing the second damper 213. The drive hub 211, the drive ring 212 and the second damper 213 constitute a first rotor 212.

A second rotor 220, which is made of metal, has an outer wall 224 and an inner wall 221 whose outside diameter is smaller than that of the outer wall 224. A side periphery of the outer wall 224 is connected by bolts to the drive ring 212 so that the second rotor 220 rotates together with the first rotating body 211 via the second damper 213. An inner circumference of the inner wall 221 is rotatably supported by a front housing 101 of the compressor 100 via a radial contact roller bearing 225 installed on a cylindrical boss 102 formed in the front housing 101. The drive ring 212 and the second rotor 220 constitute a second rotating body 220a. The drive ring 212 and the outer wall 224 constitute an outer circumferential wall.

A third rotor 230 (third rotating body) is a torque limiter which transfers torque of the second rotor 220 to a shaft 103 of the compressor 100 and, when the torque to be transmitted exceeds a given value, interrupts a torque transmission to the shaft 103.

Figure 5:
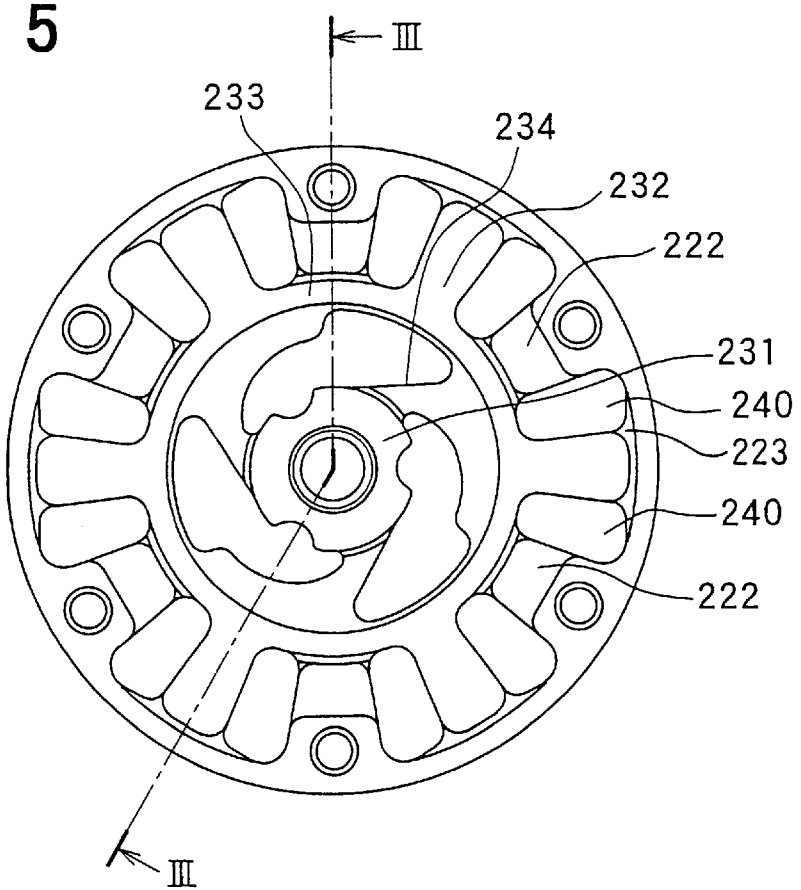
FIG. 5 is a cross sectional view taken along a line V—V of FIG. 2.

The third rotor 230, as shown in FIG. 5, is composed of a cylindrical inner hub 231, an outer ring 233 being provided on an outer circumference thereof with a plurality of outward protrusions 232 extending radially outward at given angular intervals in order to receive the torque from the second rotor 220, and a plurality of bridge portions 234 bridging mechanically the outer ring 233 and the inner hub 231. The inner hub 231 is provided on an inner circumferential surface thereof with splines that are engaged with splines provided on an outer circumferential surface of the shaft 103. The bridge portions 234 usually allows to transfer the torque from the outer ring 233 to the inner hub 231 and, when the torque transferred from the outer ring 233 to the inner hub 231 exceeds a predetermined value, the bridging portions 234 brake down so that torque transmission is interrupted.

The bridge portions 234 and the inner hub 231, both of which are made of metal, are formed integrally into one body. The outer ring 233, which is made of resin, and the bridge portions 234 integrated with the inner hub 231 are formed by insert molding and integrated into a body.

The second rotor 220 is integrally provided on the outer wall 224 with a plurality of inward protrusions 222 extending radially inward at given angular intervals. The respective inward and outward protrusions 222 and 232 are alternately positioned circumferentially so as to be overlapped radially with each other so that each of the outward protrusions 232 is put in a recess 223 formed between the adjacent two inward protrusions 222 with given spaces on circumferentially opposite sides thereof.

First dampers 240 made of elastically deformable material such as EPDM (a three elements copolymer rubber made of ethylene, propylene and xylem) are inserted into the recesses 223 between the respective inward and outward protrusions 222 and 232. Accordingly, the torque transferred to the outer wall 224 is transferred from the inward protrusions 222 via the first dampers 240 to the outward protrusions 232.

When the first dampers 240 are circumferentially compressed to transfer the torque from the inward protrusions 222 to the outward protrusions 232, opposite radial ends of each of the first dampers 240 come in contact with outer circumferential surface of the third rotating body 230 and inner circumferential surface of the second rotating body 220, respectively, so that the first dampers 240 serves to prevent the third rotating body 230 from shifting radially (shifting perpendicularly to a longitudinal direction of the shaft 103). As a result, an erroneous operation of the torque limiter 230 due to a deviation of its rotating axis is prevented.

As mentioned above, as the inner wall 221 of the second rotor 220 is rotatably held by the front housing 101 (cylindrical boss 102) of the compressor 100, an eccentric load acting on the joint 200 according to the rotation thereof is received by the front housing 101 whose stiffness is higher that that of the shaft 103 or 310.

Accordingly, bending moment acting on the drive or driven shaft 310 or 103 and load acting on the bearing 320 or a bearing (not shown) provided in the compressor 100 for rotatably supporting the shaft 103 are limited, resulting in improving reliability and endurance of the compressor 100 not only at low speed operation but also at high speed operation.

Further, since the eccentric load acting on the joint 200 is mainly received by the housing 101, excessive eccentric load is not applied to the torque limiter 230 so that an erroneous operation of the torque limiter is prevented.

Furthermore, since the first and second dampers 240 and 213 are arranged in series in a torque transmission route extending from the drive shaft 310 to the driven shaft 301, a composite elastic coefficient of the first and second dampers 240 and 213 is smaller so that the torque fluctuation is adequately absorbed.

Second Embodiment

The second rotor 220 according to the first embodiment is manufactured by forging, casting or machining (shaving). However, according to a second embodiment, the second rotor 220 composed of the outer wall 224, the inward protrusions 222 and the inner wall 221 is manufactured by press working a plate, as shown in FIGS. 6 and 7.

The second rotor 220 according to the second embodiment is lighter and its manufacturing cost is lower, resulting in minimizing the eccentric load produced by the rotation of the joint 200. Accordingly, reliability and endurance of the compressor 100 are improved, while the erroneous operation of the torque limiter 230 due to the eccentric load is prevented.

Figure 6:
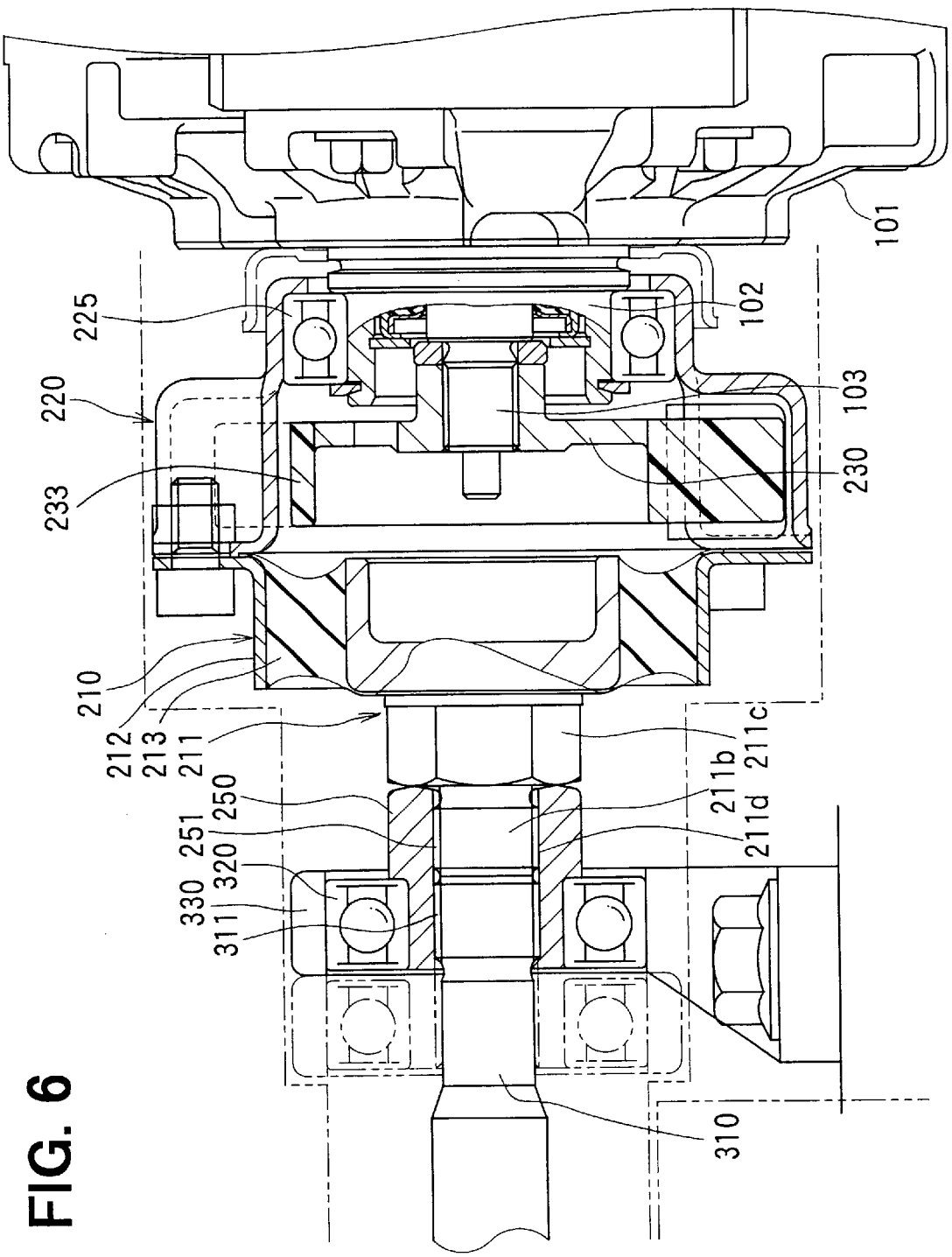
FIG. 6 is a cross sectional view of a joint according to a second embodiment.
Figure 7:
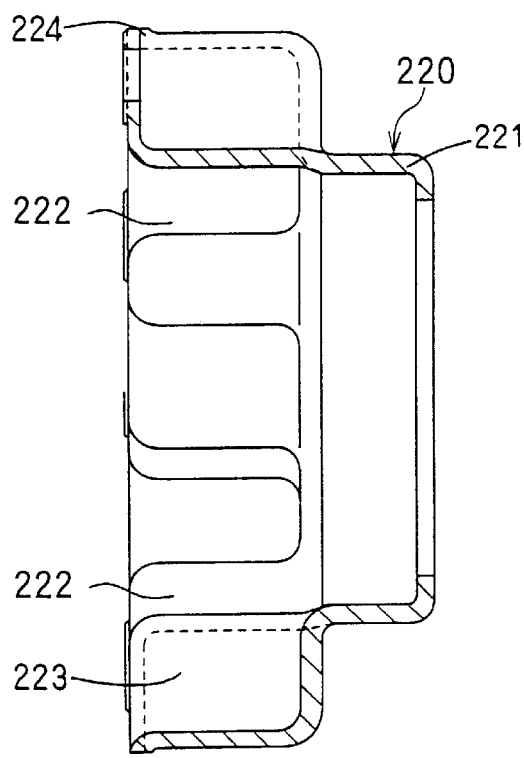
FIG. 7 is a cross sectional view of a second rotor of the joint according to the second embodiment.

Further, according to the second embodiment, as shown in FIG. 6, the drive hub 211, which has a small diameter portion 211b and a large diameter portion 211c, is formed in a step shape. The small diameter portion 211b is provided on an outer circumference with a male thread portion 211d. A male thread portion 311 is formed on an outer circumference of the drive shaft 310 on a side of the axial end thereof. While the axial end of the shaft 310 and the axial end of the small diameter portion 211b are brought into contact with each other, a female thread portion 251 formed on an inner circumference of a joint nut 250 is screwed into both of the male thread portions 311 and 211d until the axial end of the joint nut 250 comes in contact with an axial end of the large diameter portion 211c so that the drive shaft 310 is coaxially and rigidly connected with the first rotor 210 (first rotating body 211).

With the structure mentioned above, torque applied to the drive shaft 310 is transferred without fail to the first rotating body 211, since the joint nut 250 are in contact with the large diameter portion 211c.

The female thread portion 251 and the male thread portions 311 and 211d are formed in such shapes that they are fastened to each other in a rotating direction of the drive shaft 310.

When the joint nut 250 is screwed for fastening, the bracket 330 having the bearing 320 is not fixed to the base and, as illustrated in FIG. 6, is moved together with the joint nut 250 from a position shown by a two dots-slash line to a position shown by a rigid line. After having fastened the joint nut 250, the bracket 330 is fixed by a bolt to the base.

Third Embodiment

Figure 8:
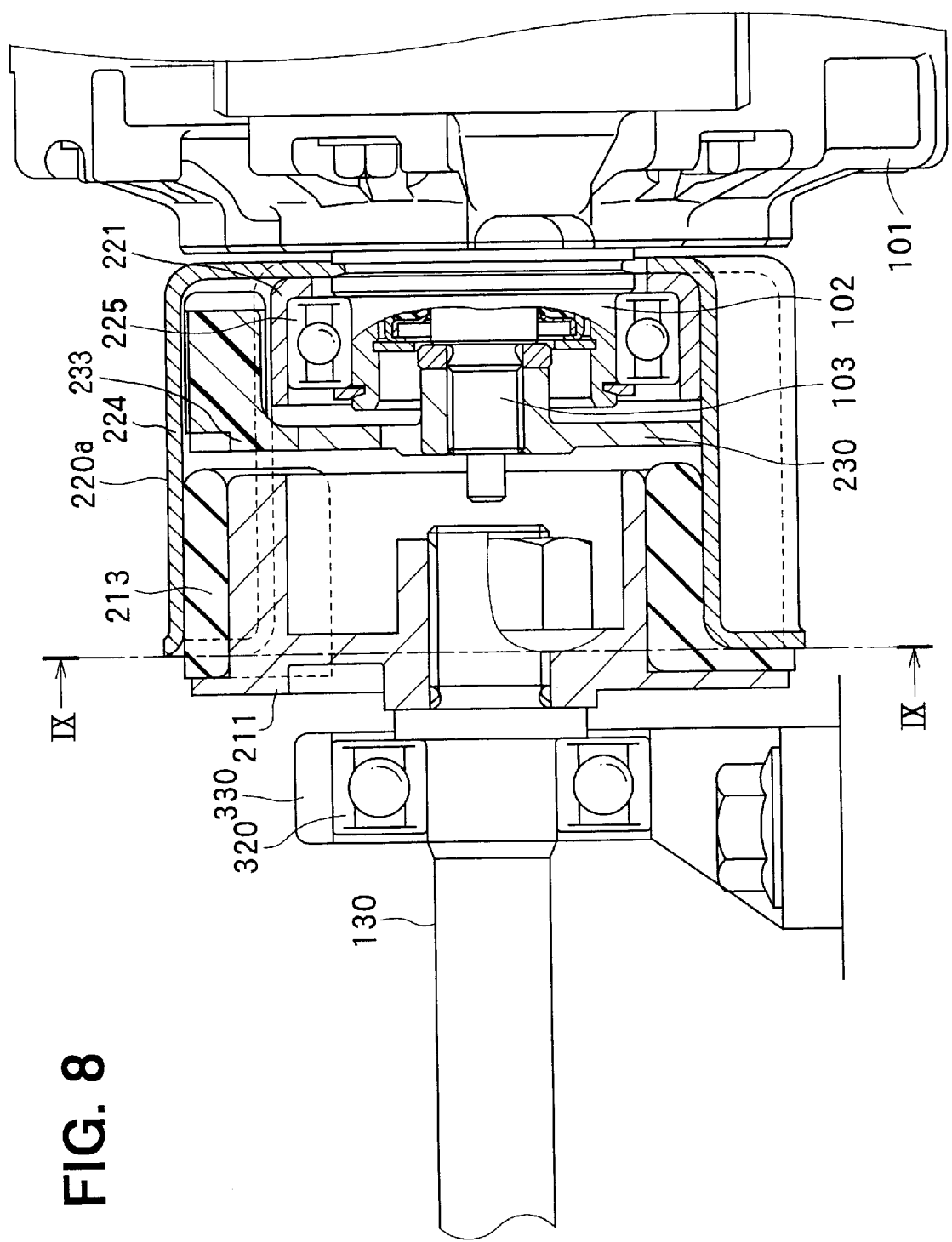
FIG. 8 is a cross sectional view of a joint according to a third embodiment.

According to the first and second embodiments, the second rotating body 220a is composed of the second rotor 220 having the outer and inner walls 224 and 221, and the drive ring 212 fixed to the outer wall 224 of the second rotor 220. According to third embodiment, the second rotating body 202a, as shown in FIG. 8, is composed of the outer wall 224 formed by press working and the inner wall 221 that is formed press working and fixed to the outer wall, for example, by welding. The joint 200 according to the third embodiment does not have the drive ring 212 but has the outer wall extending axially so as to hang over the drive hub 211. The second damper 213 is arranged between the outer wall 224 and the drive hub 211 (the first rotating body). The outer wall 224 constitutes the outer circumferential wall.

Figure 9:
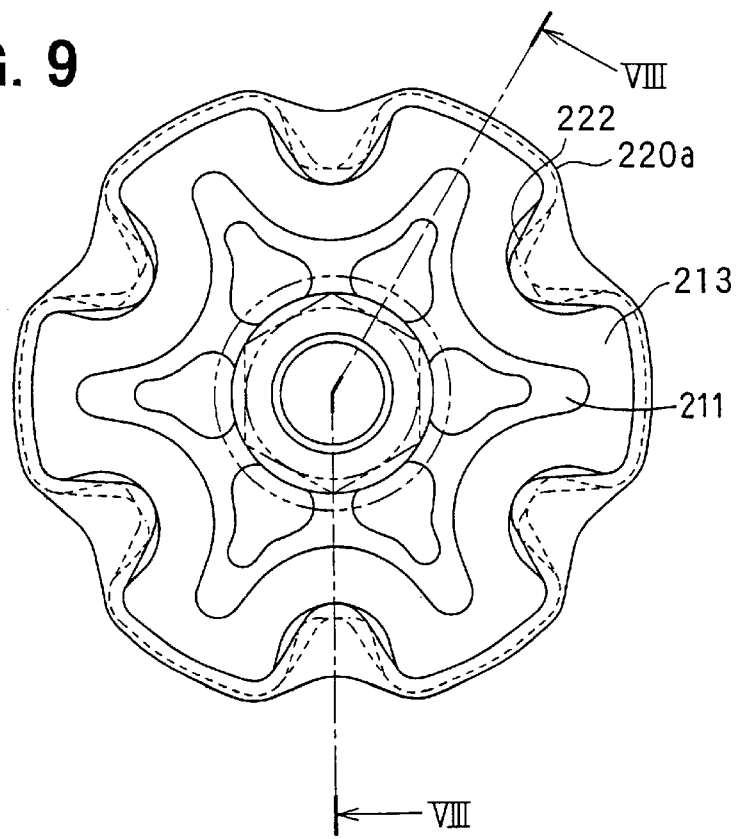
FIG. 9 is a cross sectional view taken along a line IX—IX of FIG. 8.

As shown in FIG. 9, the inward protrusions 222, which further extend axially from a side of the third rotating body 230 toward the first rotating body 211 (drive hub), are formed by drawing (press working) on an entire circumference of the outer wall 224. The drive hub 211 is formed in a star (gear) shape. The second damper 213, which is made of rubber, is adhered to the drive hub 211 by vulcanizing. The inward protrusions 222 according to the third embodiment serves to transfer torque not only from the first rotating body 211 to the second rotating body 220a via the second damper 213 but also from the second rotating body 202a to the third rotating body 230 via the first damper 240.

Fourth Embodiment

Figure 10:
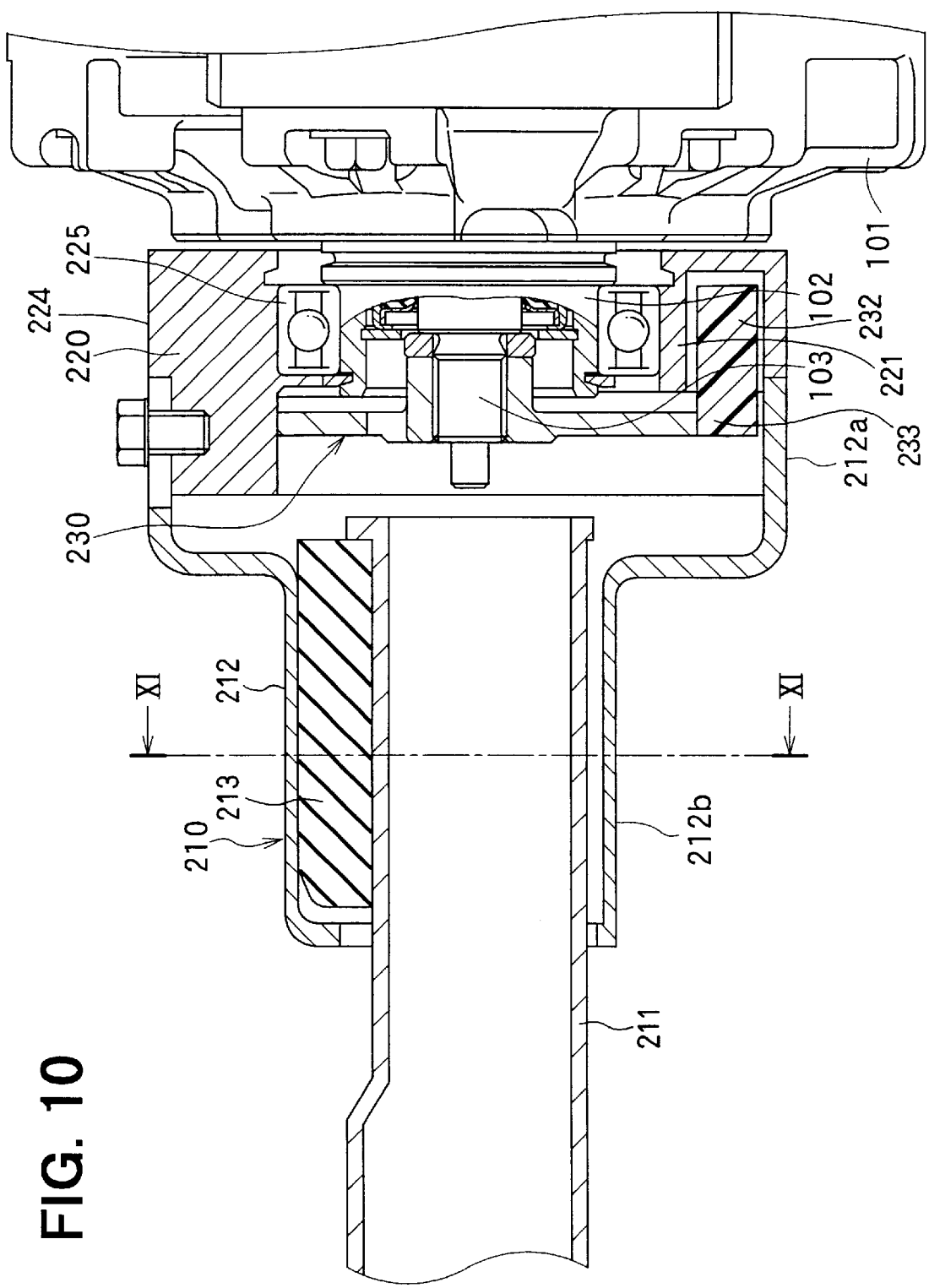
FIG. 10 is a cross sectional view of a joint according to a fourth embodiment.
Figure 11:
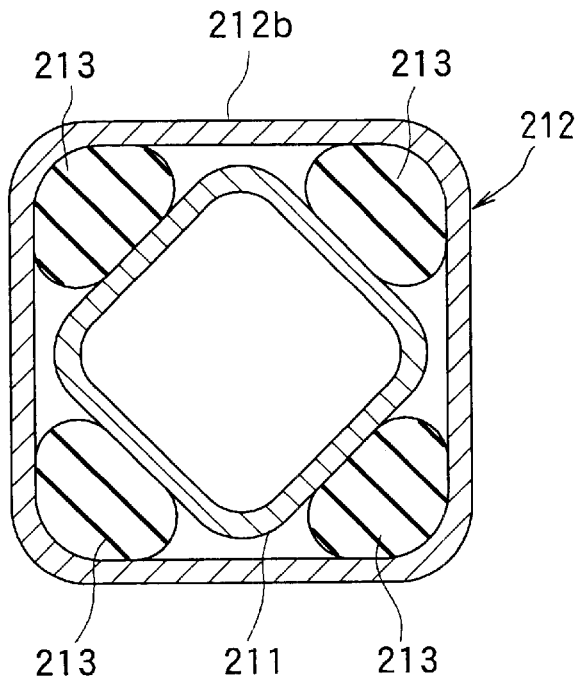
FIG. 11 is a cross sectional view taken along a line XI—XI of FIG. 10.

According to a fourth embodiment, the first rotor 210 is formed in a night halt type. As shown in FIG. 10, the drive ring 212 is formed in a pipe shape having a step so as to have a large diameter pipe portion 212a and a small diameter pipe portion 212b. The drive hub 211 is formed also in a pipe shape. As shown in FIG. 11, a cross sectional shape of the small diameter pipe portion 212b is roughly square and a cross sectional shape of the drive hub 211 is also roughly square.

The drive hub 211 is inserted into the small diameter pipe portion 212b with about 45° angular phase difference (an angle of a diagonal line of the drive hub 211 to that of the small diameter pipe portion 212b is 45°). The rubber second damper 213 is arranged in each of four corner spaces formed inside the small diameter pipe portion 212b. The pipe shaped drive hub 211 is directly connected with the drive shaft 310.

Fifth Embodiment

Figure 12:
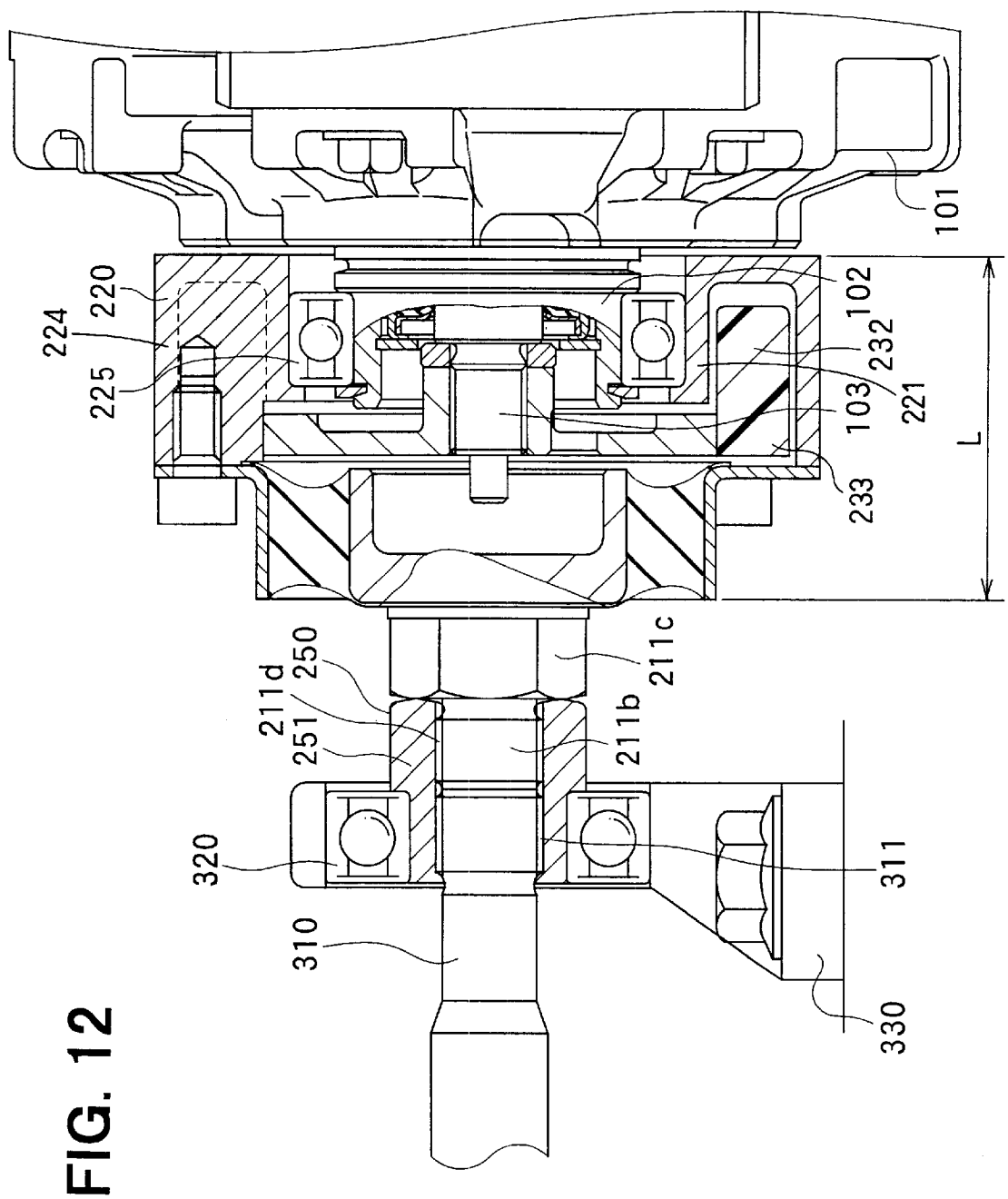
FIG. 12 is a cross sectional view of a joint according to a fifth embodiment.

According to the first embodiment, as shown in FIG. 3, both of the outward protrusions 232 of the torque limiter 230 and the inward protrusions 222 of the second rotor 220 extend axially from the torque limiter 230 toward the first rotor 210. However, according to a fifth embodiment, as shown in FIG. 12, the outward and inward protrusions 232 and 222 extend axially from the torque limiter 230 toward the compressor 100 (to a space radially opposite to the radial contact roller bearing 225 with respect to the inner wall 221). Accordingly, an axial length L of the joint 200 is shorter.

Figure 13:
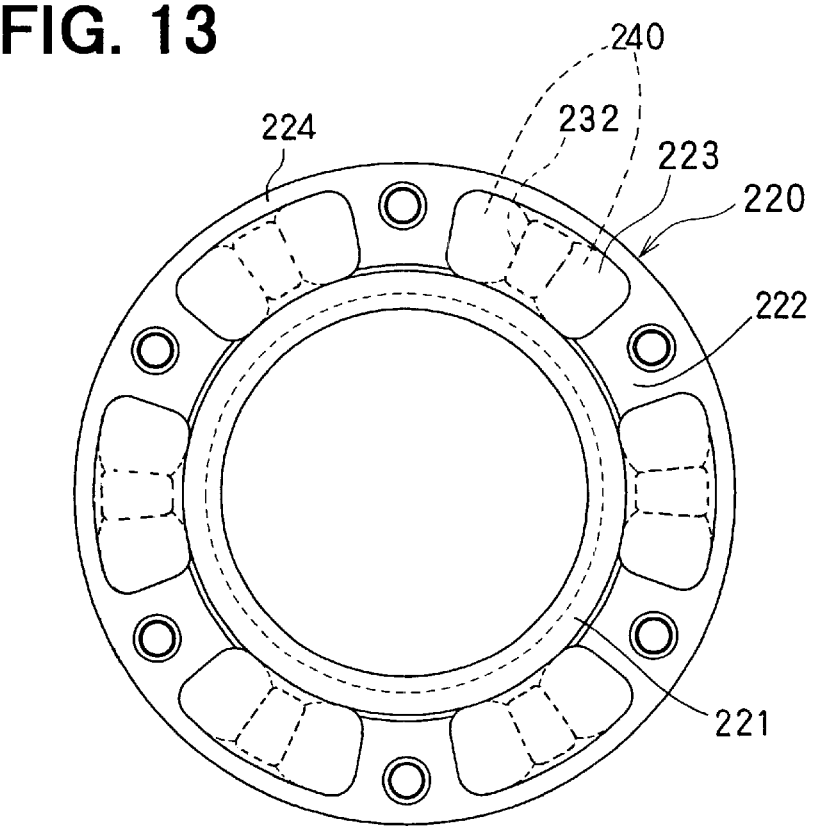
FIG. 13 is a plane view of a second rotor of the joint according to a fifth embodiment.

As shown in FIG. 13, the inward protrusions 222 extend radially inward from the outer wall 224 up to the inner wall 221 so that recesses 223 are circumferentially formed at given angular intervals in side the outer wall 224. The protrusions 232 of the torque limiter 230 are axially inserted into the recesses 223 and the first damper 240 is sandwiched between the respective outward and inward protrusions 232 and 222.

Sixth Embodiment

Figure 14:
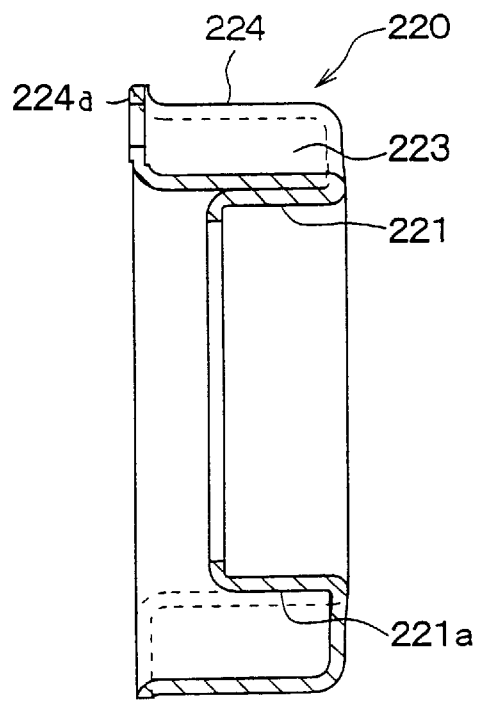
FIG. 14 is a cross sectional view of a second rotor of a joint according to a sixth embodiment.
Figure 15:
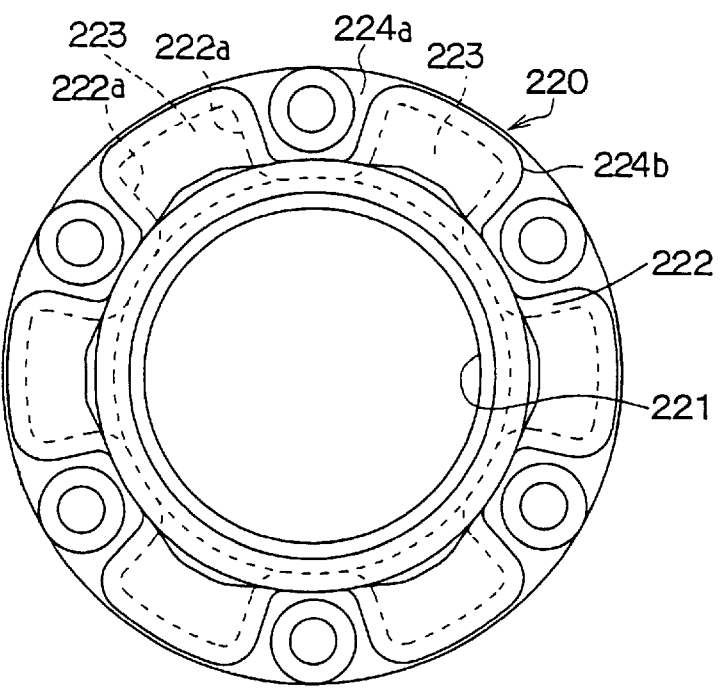
FIG. 15 is a side view of the second rotor as viewed from a right side in FIG. 14.
Figure 16:
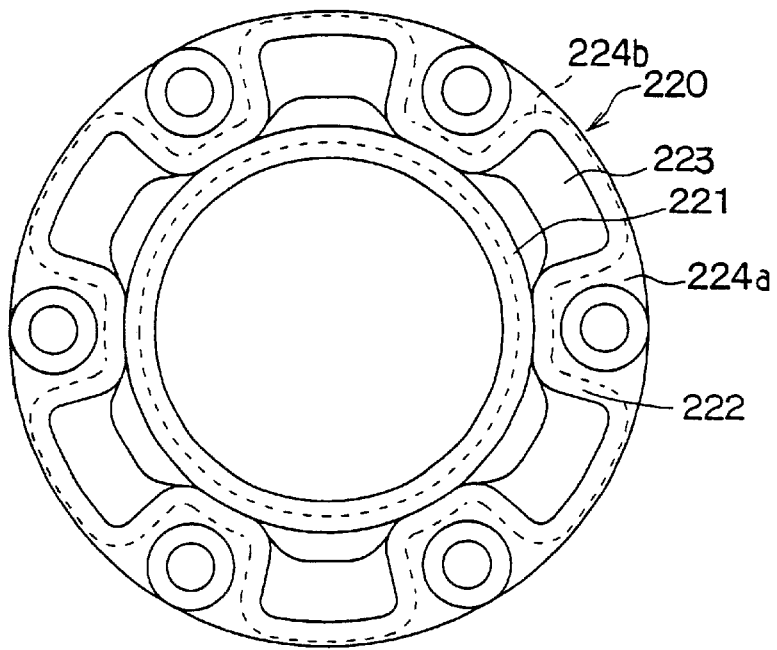
FIG. 16 is a side view of the second rotor as viewed from a left side in FIG. 14.

FIG. 14 shows a cross section of the second rotor 220 as viewed axially. FIG. 15 illustrates the second rotor 220 as viewed from a right side in FIG. 14. FIG. 16 illustrates the second rotor 220 as viewed from a left side in FIG. 14. According to a sixth embodiment, the outer wall 224 and the inner wall 224 of the second rotor 220 is integrally formed of a metal plate by press working (plastically deforming), as shown in FIGS. 14 to 16.

Figure 17:
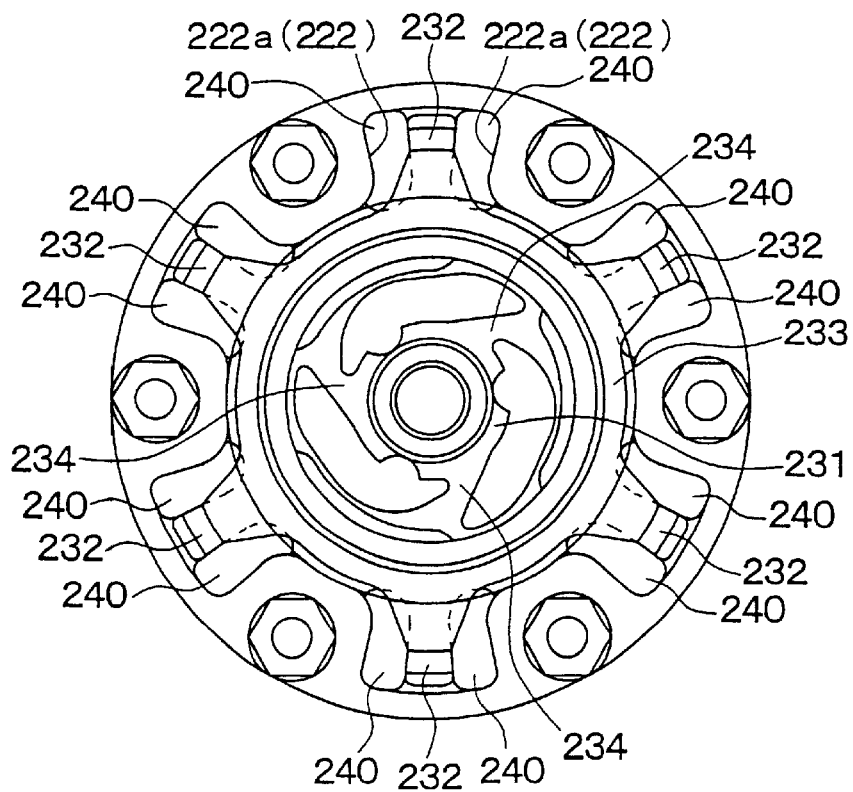
FIG. 17 is a plane view of the second rotor with which a third rotating body is coupled according to the sixth embodiment.

The outer wall 224 is provided on an axial outer periphery thereof with a connecting ring portion 224a, to which the drive ring 212 is fixed by bolts and nuts, and on an outer circumference thereof with a wave shaped outer circumferential portion 224b. The wave shaped outer circumferential portion 224b has the plurality of the inward protrusions 222, which radially extend up to the inner wall 221 and are circumferentially arranged at given angular intervals, and the recesses 223 formed inside between the two circumferentially adjacent inward protrusions 222. The first damper 240 is accommodated in the respective recesses 223 so as to be sandwiched between the inward and outward protrusions 222 and 232, as shown in FIG. 17. The first damper 240 is accommodated in each of the recesses 223 inside the outer wall 224 and outside the inner wall 221. There is provided a small gap between the second damper 240 and an outer circumference 221a of the inner wall 221 or the second damper 240 may be in contact with the outer circumference 221a of the inner wall 221 (or, as a case may be, via a thin layer whose thickness is thinner than that of the metal plate constituting the second rotor 220).

Side surfaces 222a of each of the inward protrusions 222 for forming each of the recesses 223 extend inward substantially in parallel to each other.

As each of the recesses 223 extends radially up to the outer circumference 221a of the inner wall 221 whose inner circumference is directly fixed to the outer circumference of the radial contact roller bearing 225 but also axially up to the axial end of the inner wall 221, the larger first damper 240 can be accommodated in the recesses 223.

Seventh Embodiment

Figure 18:
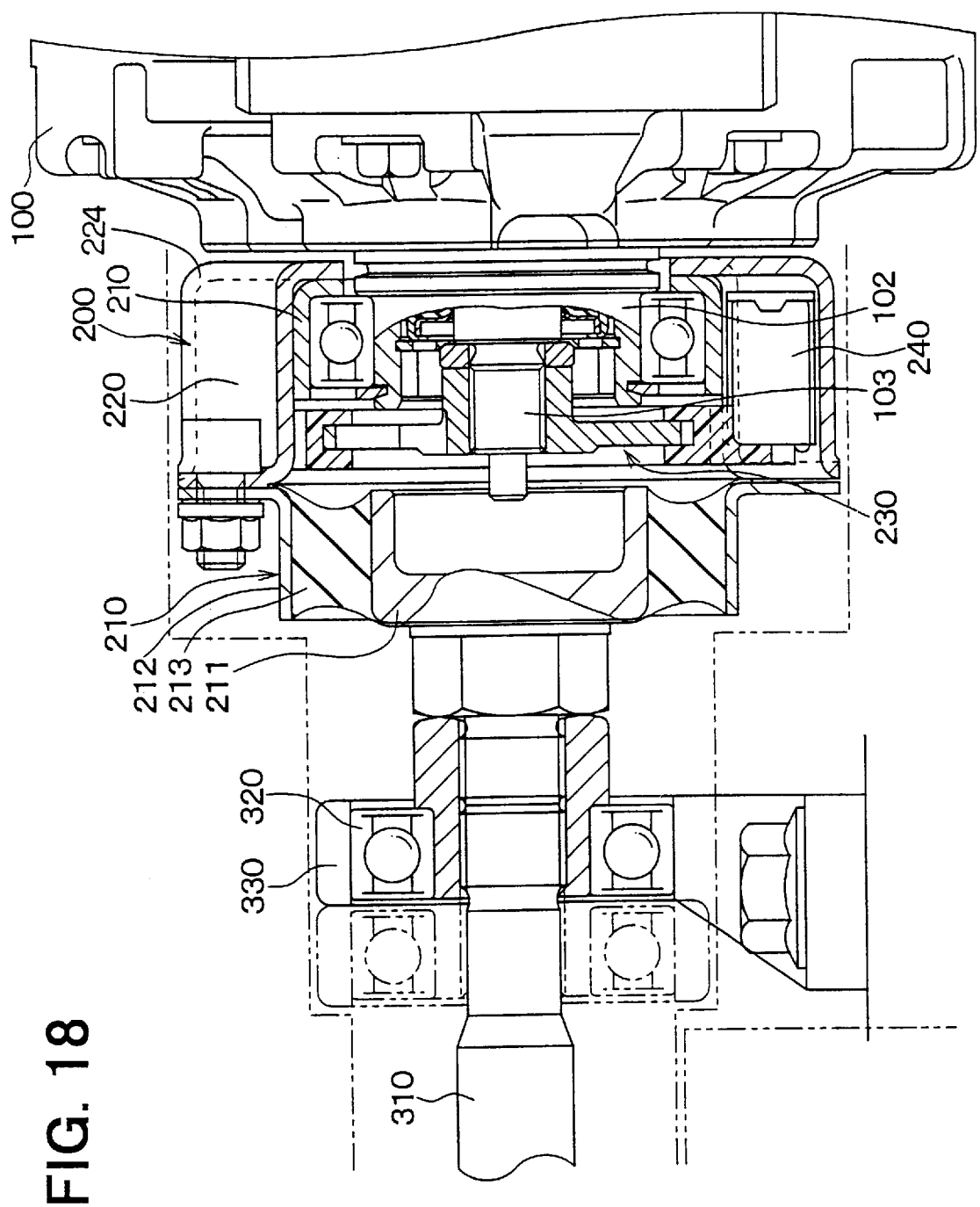
FIG. 18 is a cross sectional view of a joint according to seventh embodiment.
Figure 19:
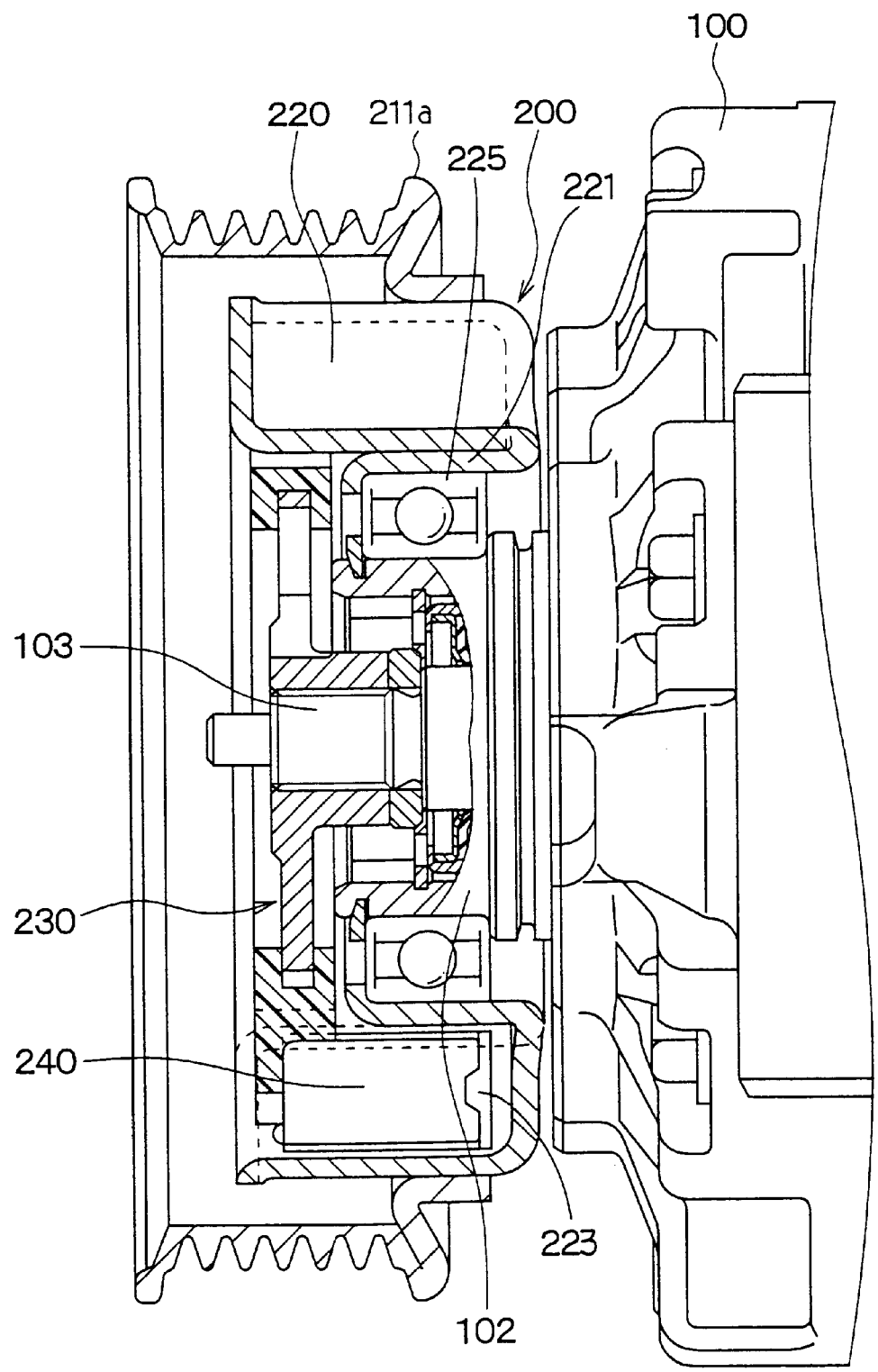
FIG. 19 is a cross sectional view of a joint according to an eighth embodiment.
Figure 20:
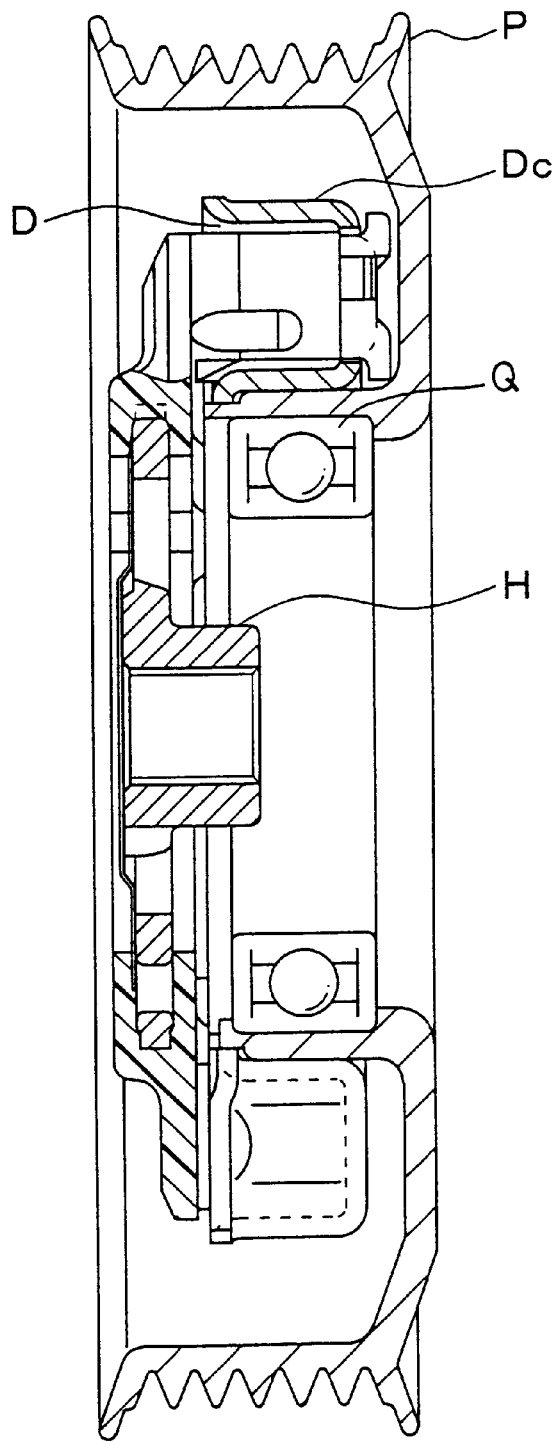
FIG. 20 is a cross sectional view of a conventional joint as a prior art.

According to the sixth embodiment, the outer wall 224 and the inner wall 211 are integrally formed of the metal plate by press working. However, according to seventh embodiment, the outer wall 224 having the connecting ring portion 224a and the wave shaped circumferential portion 224b is formed of a metal plate and the inner wall 221 is fixed to the outer wall 224 by welding, as shown in FIG. 18. This structure makes it easy to manufacture the second rotor 220.

Eighth Embodiment

According to an eighth embodiment, the first rotor 211 is a pulley 211a which transfers torque of the engine in use of a V belt or a belt with teeth. An inner circumferential surface of the pulley 211a is fixed to an outer circumference of the second rotor 220 by welding. Accordingly, the larger second damper 240 can be accommodated in the recesses 223 since the inner wall 211 is directly fixed to the radial contact roller bearing 225.

The flexible joint 200 is applicable not only to the stationary air conditioner as mentioned above but also to any other devices such as an air conditioner for vehicles.

Further, material of the first or second damper 240 or 213 is not limited to EPDM (rubber) but may be any other elastically deformable material such as resin or metal.

Though the joint 200 is applied to the device where torque is transferred from the second rotating device to the third rotating device in the embodiments mentioned, the joint 200 may be applied to a device where the torque is transferred from the third rotating body to the second rotating body.

What is claimed is:

1. A flexible joint for transferring torque from a shaft of a drive device to a shaft of a driven device, the flexible joint comprising:

a first rotating body to be connected to one of the shaft of the drive device and the shaft of the driven device;

a second rotating body that is coaxially connected with the first rotating body and has an outer circumferential wall and an inner wall, the inner wall being rotatably held by an other one of the shaft of the drive device and the shaft of the driven device;

a third rotating body to be connected to the shaft of the other one of the shaft of the drive device and the shaft of the driven device, the third rotating body being provided with a torque limiter for interrupting a torque transmission from the shaft of the drive device to the shaft of the driven device via the first rotating body and the second rotating body when torque applied to the third rotating body exceeds a predetermined value;

an elastically deformable first damper through which the second rotating body is coaxially coupled with the third rotating body at a position inside the outer circumferential wall and outside the inner wall; and an elastically deformable second damper disposed between an outer circumference of the first rotating body and an inner circumference of the second rotating body to transfer the torque between the first rotating body and the second rotating body.

2. A flexible joint according to claim 1, wherein:

the second rotating body is provided on the outer circumferential wall with a plurality of inward protrusions extending radially inward at given angular intervals;

the third rotating body is provided on an outer circumference thereof with a plurality of outward protrusions extending radially outward at given angular intervals;

the plurality of inward protrusions and the plurality of outward protrusions are alternately positioned circumferentially and respectively so as to be overlapped radially with each other; and the first damper comprises a plurality of damper piece units circumferentially arranged between the plurality of inward protrusions and the plurality of outward protrusions.

3. A flexible joint according to claim 1, wherein, when the torque is transferred between the second rotating body and the third rotating body, the first damper, while being compressed circumferentially, serves to restrict the third rotating body from shifting perpendicularly to an axial direction of the shaft of the other one of the shaft of the drive device and the shaft of the driven device.

4. A flexible joint according to claim 1, wherein the first rotating body is connected to the second rotating body on a side axially opposite to the inner wall rotatably held by the other one of the shaft of the drive device and the shaft of the driven device.

* * * * *